United States Patent Office 2,874,198
Patented Feb. 17, 1959

2,874,198

STABILIZATION OF PERFLUOROCHLOROOLEFIN POLYMERS

William S. Barnhart, Cranford, and Robert H. Wade, Ridgeview Drive, N. J., assignors, by mesne assignments, to Minnesota Mining and Manufacturing Company, St. Paul, Minn., a corporation of Delaware No Drawing. Application May 26, 1954
Serial No. 432,589

8 Claims. (Cl. 260—652.5)

This invention relates to the treatment of perfluorochloroolefin polymers. In one of its aspects, the invention relates to the stabilization of perfluorochloroolefin plastics, greases, oils and waxes. In one of its more particular aspects, this invention relates to a method of improving the heat-aging characteristics i. e. the thermal stability, of trifluorochloroethylene polymers.

Polymerization of the perfluorochloroolefins may be effected so as to yield a variety of polymeric materials. For example, trifluorochloroethylene may be polymerized to yield oil, greases and soft to hard brittle waxes. This monomer may also be polymerized under suitable conditions to yield a high molecular weight thermoplastic polymer. The physical and chemical characteristics of the perfluorochloroolefin polymers are different from the characteristics of similar but non-fluorinated polymeric materials. The chemical resistance, for example of polytrifluorochloroethylene, is such that it will withstand exposure to a wide variety of oxidizing and reducing materials, such as fuming nitric acid, concentrated sulfuric acid, hydrazine, and hydrogen peroxide. Physically, the material possesses high heat-stability and excellent electrical properties and with respect to the high molecular weight thermoplastic material, excellent tensile strength. Polymers of the perfluorochloroolefins in the oil, grease and wax range are widely used as transformer oils, hydraulic fluids, etc. in applications where other materials are not suitable. The high molecular weight polymers of the perfluorochloroolefins are used as valve seats and gaskets in corrosive atmospheres and as electrical insulators.

Despite their high degree of thermal stability, the perfluorochloroolefin polymers are still somewhat subject to the effects of heat, particularly when maintained at elevated temperatures for prolonged periods of time. Upon prolonged exposure to high temperature, degradation occurs. This degradation is in reality a thermal cracking of the polymer chain with a consequent reduction in molecular weight of the polymer, and is evidenced in the case of the high molecular weight thermoplastic polymer by a reduction in the N. S. T. (no strength temperature—a measure of a molecular weight) of the polymer. Thus, when a homopolymer of trifluorochloroethylene having an N. S. T. of 332° C. is maintained at a temperature of about 325° C. for one hour the N. S. T. is reduced to 235° C. Slight degradation of the thermoplastic polymer may also occur during the molding operations, particularly when the polymer is maintained at high temperature for excessive periods of time. In the case of the liquid, grease and wax-like polymers of the perfluorochloroolefins, such as trifluorochloroethylene, degradation is evidenced by a change in the viscosity or other physical characteristics of the material which frequently renders the material useless in the application for which it is intended.

It is an object of this invention, to provide a process for improving thermal stability of the perfluorochloroolefin polymers.

It is another object of this invention to provide a means for stabilizing the polyperfluorochloroolefins.

It is one of the more particular objects of this invention, to improve the thermal stability of polymers of trifluorochloroethylene.

Various other objects and advantages will become apparent to those skilled in the art on reading the accompanying description and disclosure.

Generally, the above objects are accomplished by admixing with the polymer that is to be stabilized a minor proportion of a stabilizing agent. The stabilizing agent comprises at least one compound selected from the group consisting of oxides and acetates of the alkaline earth metals and the acetates of the alkali metals. Particularly suitable stabilizing agents are magnesium oxide, calcium oxide, strontium oxide, barium oxide, magnesium acetate, calcium acetate, strontium acetate, barium acetate, sodium acetate, lithium acetate and potassium acetate. Preferred stabilizing agents are calcium oxide and calcium acetate.

It has been found that the thermal stability of the perfluorochloroolefin polymers may be improved by addition of at least one of the compounds mentioned above. The ability to retard degradation at high temperatures is peculiar to the stabilizing agent of this invention. Thus, compounds, such as titanium dioxide and silica have no effect on perfluorochloroolefin polymers, while other compounds such as the oxides of iron, copper and selenium, the metal halides and tin polysulfide (Thermolite) promote degradation.

Stabilization of the polymer is effected by admixing with the polymer between about 0.001 and about 10 percent, preferably between about 0.1 and about 5 percent of at least one of the stabilizing agents listed above. The exact concentration of the stabilizing agent in the polymer will be determined by the type of polymer i. e. oil, grease or thermoplastic which is to be stabilized and the conditions under which the polymer is to be used. Thus, with oils and light greases a lower concentration of stabilizer, usually between about .1 and about 1 percent is employed, whereas when waxes and thermoplastic polymers are to be stabilized between 1 and 2 percent of the stabilizer is usually added. Again, when the polymer is to be used at particularly high temperatures, higher concentrations of stabilizer are employed, for example between about 2 percent and about 5 percent. High temperatures are usually encountered during the molding of the thermoplastic perfluorochloroolefin polymer and during fusion of polymer coatings obtained from a dispersion of solid polymer in a solvent. These dispersions usually contain in addition to the solid polymer and solvent a quantity of a wax-like polymer which acts as a fusion aid. The stabilizing agents of this invention retard degradation of the polymer at high temperatures, but do not otherwise alter the physical and chemical characteristics of the polymer.

As indicated above this invention is applicable to the stabilization of perfluorochloroolefin polymers and is particularly suited to the stabilization of polymers of trifluorochloroethylene. The thermoplastic homopolymers of trifluorochloroethylene which may be stabilized are characterized by their no strength temperature which is above about 220° C., usually above 300° C. The wax-like polymers of trifluorochloroethylene are characterized by their melting point which is usually between about 75° C. and about 125° C. The oils and greases are characterized by their boiling points which is usually between about 95° C. and about 250° C. at 0.5 mm.

This invention also contemplates the treatment of copolymers of trifluorochloroethylene containing below about 5 mol percent of fluorine containing olefins, such as perfluorobutadiene, vinylidene fluoride, difluorodichloroethylene, difluoroethylene, trifluoroethylene, perfluorostyrene, perfluorocyclobutene and phenyl trifluoroethylene.

The stabilizer can be added to an individual polymer as for example, to an oil or to a grease and can additionally be added to the mixtures of the oils, greases, etc. For example, the thermoplastic polymer of trifluorochloroethylene is usually plasticized with the oily low molecular weight polymer of trifluoroethylene. The addition of the stabilizer to the aforementioned plasticized polymer is also within the scope of this invention.

Admixing of the stabilizing agent with the polymer may be effected in a variety of ways although usually the conventional mechanical techniques are preferred. The method to be employed in effecting the admixture is based on the particle size of the stabilizing agent and of the polymer if the polymer is a thermoplastic and in powder form. Thus, if the polymer which is to be stabilized is a thermoplastic, and if both the stabilizing agent and the polymer are in finely divided form, conventional tumbling type mixers, such as barrel mixers, conical mixers and mushroom mixers may be employed. If the thermoplastic polymer and stabilizing agent are not already finely divided then they must be ground in order to secure thorough admixture. Although the grinding of the stabilizing agent with the polymer may be effected separately, it is preferred that they be ground together since the presence of the stabilizing agent will also retard thermal degradation which is apt to result during the grinding operation. Grinding of the polymer and stabilizing agent may also be effected in conventional equipment, such as ball and pebble mills, colloid mills and hammer mills. A particularly suitable type of grinding equipment is the Mikropulvarizer—a hammer type mill which functions by forcing the material being ground through an appropriate size screen by means of a hammer action.

If the polymer to be stabilized is in the oil, grease or wax range, then equipment suitable to the blending of oils and greases may be employed, such as a ribbon blender, a three roll paint mill, etc.

In order to fully illustrate the process of this invention the following examples together with the tabulated data are presented below.

*Example I*

Approximately one percent of the stabilizing agent indicated below was added to a normally liquid homopolymer of trifluorochloroethylene having a boiling range between about 95° C. and about 250° C. at 0.5 mm. Approximately 4 ml. samples of the oil were heated in a test tube for 2½ hours at 150° C. Degradation was detected by observing the effect on a partially immersed strip of ashless filter paper. In this test arbitrary ratings are assigned as indicated in the footnote on the page.

| Additive | Discolorize[1] | Tenderize |
| --- | --- | --- |
| Calcium Oxide | 0 | No. |
| Magnesium Oxide | 1 | Yes. |
| Barium Oxide | 0 | Yes. |
| Calcium Acetate | 1 | Yes. |
| None | 2 | Yes. |

[1] Arbitrary rating: 0=no detectable change; 1=better than standard; 2=standard rating without stabilizer.

*Example II*

Since degradation of thermoplastic polymer results in discoloration of some types of pigments which are incorporated in the polymer, the effect of the stabilizing agents of this invention on pigmented thermoplastics was determined. In this test an olive drab pigment having the following approximate composition was used:

| | Percent |
| --- | --- |
| Cadmium oxide | 40 |
| Chromium oxide | 33 |
| Copper oxide | 17 |
| Zinc oxide | 6 |
| Iron oxide | 4 |

This pigment composition was selected because it has the least color stability of the colored pigments. (Most colored pigments change in intensity e. g. dark red becomes light red. The above described composition changes from olive drab to gray.) Additionally, the above composition was selected because it contains copper and iron oxide which promote degradation of the polymer which is to be stabilized. In this example, a homopolymer of trifluorochloroethylene having an N. S. T. of about 270° C. was admixed with the pigment and with the stabilizer in the concentration given below. Admixture was effected by blending as described herein. The resulting admixture was pressed into a plaque by compression molding. Results are tabulated below in which parts are by weight:

| Run | Polymer | Pigment | Stabilizer | Result |
| --- | --- | --- | --- | --- |
| 1 | 50 | 0.25 | 0.0 | off color. |
| 2 | 50 | 0.25 | 0.25 (CaO) | color stable. |
| 3 | 50 | 0.25 | 0.25 (MgO) | slight change in shade. |
| 4 | 25 | 0.125 | 0.0 | off color in 30 mins. |
| 5 | 25 | 0.125 | 0.25 (CaO) | color stable after 1 hr. |

All of the runs were made by heating the molded plaque at 300° C. In runs 1–3 the plaque was heated for 1.5 hours in a press. In runs 4 and 5, the plaques were heated in an oven and time noted.

From the above tables it is apparent that the compounds referred to herein as stabilizing agents markedly retard degradation of the polymer.

Various modifications and alterations of the process of this invention will become apparent to those skilled in the art without departing from the scope of this invention.

Having thus described our invention, we claim:

1. A composition stabilized against thermal degradation which consists of an admixture of a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene and between about 0.001 and about 10 percent of at least one compound selected from the group consisting of the oxides and acetates of the alkaline earth metals and the acetates of the alkali metals.

2. A composition stabilized against thermal degradation which consists of an admixture of a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene and between about 0.1 and about 5 percent by weight of at least one compound selected from the group consisting of the oxides and acetates of the alkaline earth metals and the acetates of the alkali metals.

3. A composition stabilized against thermal degradation which consists of an admixture of a homopolymer of trifluorochloroethylene having a boiling range between about 95° C. and about 250° C. at 0.5 mm. and between about 0.1 percent and about 1 percent by weight of at least one compound selected from the group consisting of the oxides and acetates of the alkaline earth metals and the acetates of the alkali metals.

4. A composition stabilized against thermal degradation which consists of an admixture of a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene having a melting point between about 75° C. and about 125° C. and between about 0.1 percent and about 1 percent of at least one compound selected from the group consisting of the oxides and acetates of the alkaline earth metals and the acetates of the alkali metals.

5. A composition stabilized against thermal degradation which consists of an admixture of a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene having an N. S. T. above about 220° C. and between about 1 percent and about 2 percent by weight of at least one compound selected from the group consisting of the oxides and acetates of the alkaline earth metals and the acetates of the alkali metals.

6. A process for stabilizing polymers of trifluorochloroethylene which consists of admixing with a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene at least one compound selected from the group consisting of the oxides and acetates of the alkaline earth metals and the acetates of the alkali metals in an amount between about 0.001 and about 10 percent by weight.

7. A process for stabilizing homopolymers of trifluorochloroethylene which consists of admixing with a homopolymer of trifluorochloroethylene at least one compound selected from the group consisting of the oxides and acetates of the alkaline earth metals and the acetates of the alkali metals in an amount between about 0.1 and about 5 percent by weight.

8. A composition stabilized against thermal degradation which consists of an admixture of a polymer containing more than 95 mol percent of trifluorochloroethylene and from 0 to less than 5 mol percent of a monomer selected from the group consisting of perfluorobutadiene, vinylidene fluoride, difluorodichloroethylene, difluoroethylene, trifluoroethylene, perfluorostyrene, perfluorocyclobutene and phenyl trifluoroethylene and between about 0.001 and about 10 percent by weight of an oxide of an alkaline earth metal.

References Cited in the file of this patent

UNITED STATES PATENTS

| 2,476,606 | Johnston et al. | July 19, 1949 |
| 2,789,959 | Smith | Apr. 23, 1957 |
| 2,798,960 | Smith | Apr. 23, 1957 |